(12) United States Patent
Farley

(10) Patent No.: US 6,601,858 B1
(45) Date of Patent: Aug. 5, 2003

(54) MANEUVERABLE SLED

(76) Inventor: Daniel K. Farley, 13008 Queen Ann South, Traverse City, MI (US) 49684

( * ) Notice: Subject to any disclaimer, the term of this patent is extended or adjusted under 35 U.S.C. 154(b) by 81 days.

(21) Appl. No.: 09/589,638

(22) Filed: Jun. 7, 2000

(51) Int. Cl.[7] .................................................. B62B 9/99
(52) U.S. Cl. ......................... 280/25; 280/845; 280/14.1
(58) Field of Search .......................... 280/25, 845, 14.1, 280/22, 22.1, 26

(56) References Cited

U.S. PATENT DOCUMENTS

| | | |
|---|---|---|
| 112,630 A | 3/1871 | Rank |
| 201,519 A | 3/1878 | Graether |
| 1,600,735 A | 9/1926 | Pederson |
| 2,323,847 A | 7/1943 | Sampsell ..................... 280/21 |
| 2,357,928 A | 9/1944 | Bowen et al. ................. 280/22 |
| 3,081,107 A | 3/1963 | Cantelli ....................... 280/21 |
| 3,173,703 A | 3/1965 | Isenberger ................... 280/21 |
| 3,276,785 A | 10/1966 | Tonelli ........................ 280/21 |
| 3,329,440 A | 7/1967 | Tonelli ........................ 280/21 |
| 3,338,589 A | 8/1967 | Barton ........................ 280/21 |
| 3,603,419 A * | 9/1971 | Riddle ........................ 180/182 |
| 3,710,750 A * | 1/1973 | Welsh ..................... 114/55.54 |
| 3,746,357 A * | 7/1973 | Haskins ....................... 280/15 |
| 4,105,217 A | 8/1978 | Metelow et al. .............. 280/28 |
| 4,389,066 A * | 6/1983 | Weir et al. .................. 280/19.1 |
| 4,466,627 A | 8/1984 | Gottlieb ..................... 280/21 A |
| 4,542,908 A | 9/1985 | Muyskens ................. 280/21 A |
| 5,000,466 A | 3/1991 | Den Hartog ............... 280/21.1 |
| 5,344,167 A | 9/1994 | Strouth ..................... 280/14.1 |
| 5,667,229 A | 9/1997 | Wenger ...................... 280/22 |
| 5,687,977 A | 11/1997 | Smith ......................... 280/18 |
| D390,500 S | 2/1998 | Walker ........................ D12/9 |

* cited by examiner

Primary Examiner—J. J. Swann
Assistant Examiner—James S. McClellan
(74) Attorney, Agent, or Firm—McAndrews, Held & Malloy, Ltd.

(57) ABSTRACT

A maneuverable sled is provided for use over snowy terrain. In particular, the sled includes a platform, a spring, and two runners. The spring slidingly engages the platform providing the sled with excellent maneuverability.

4 Claims, 5 Drawing Sheets

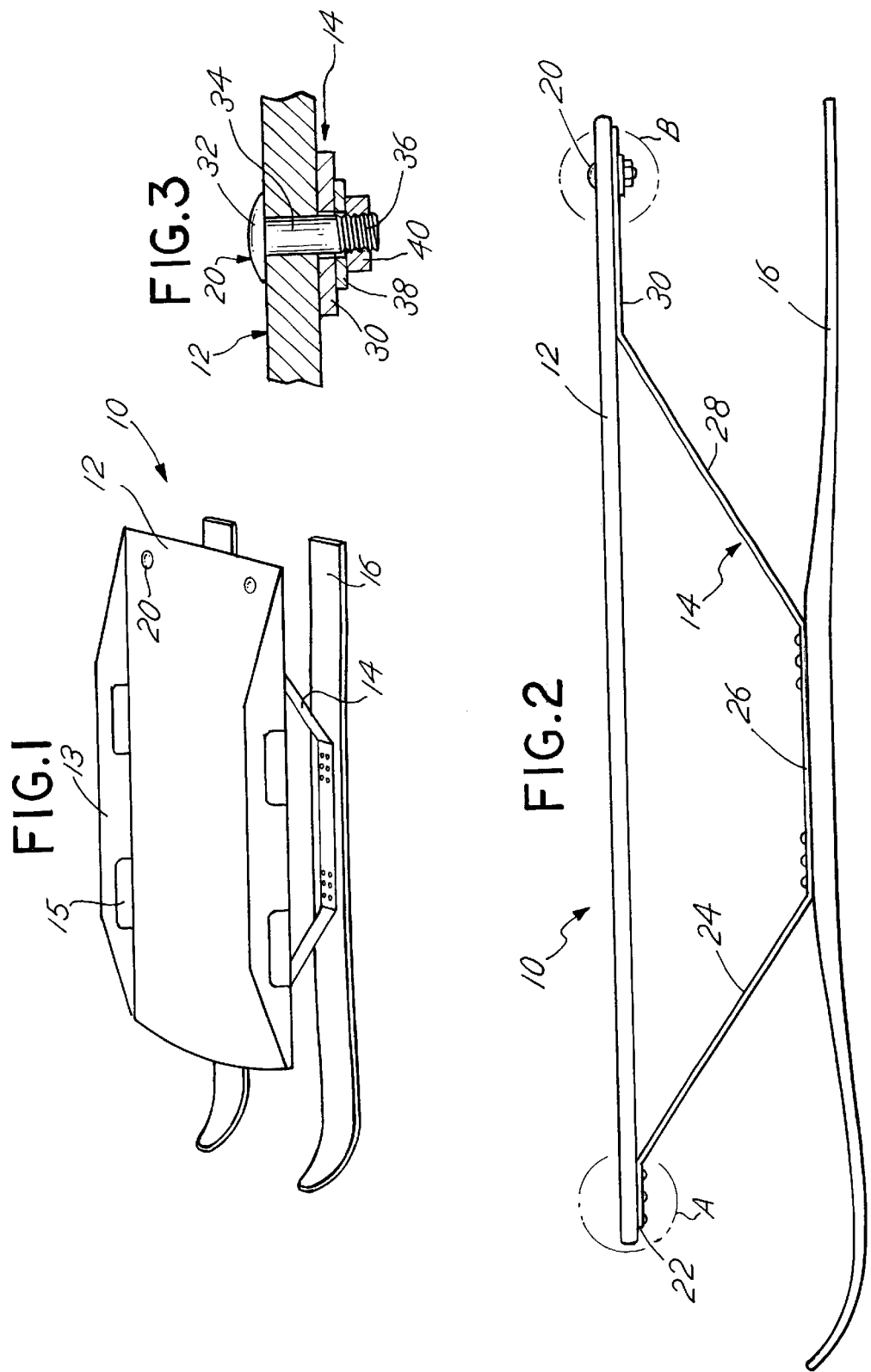

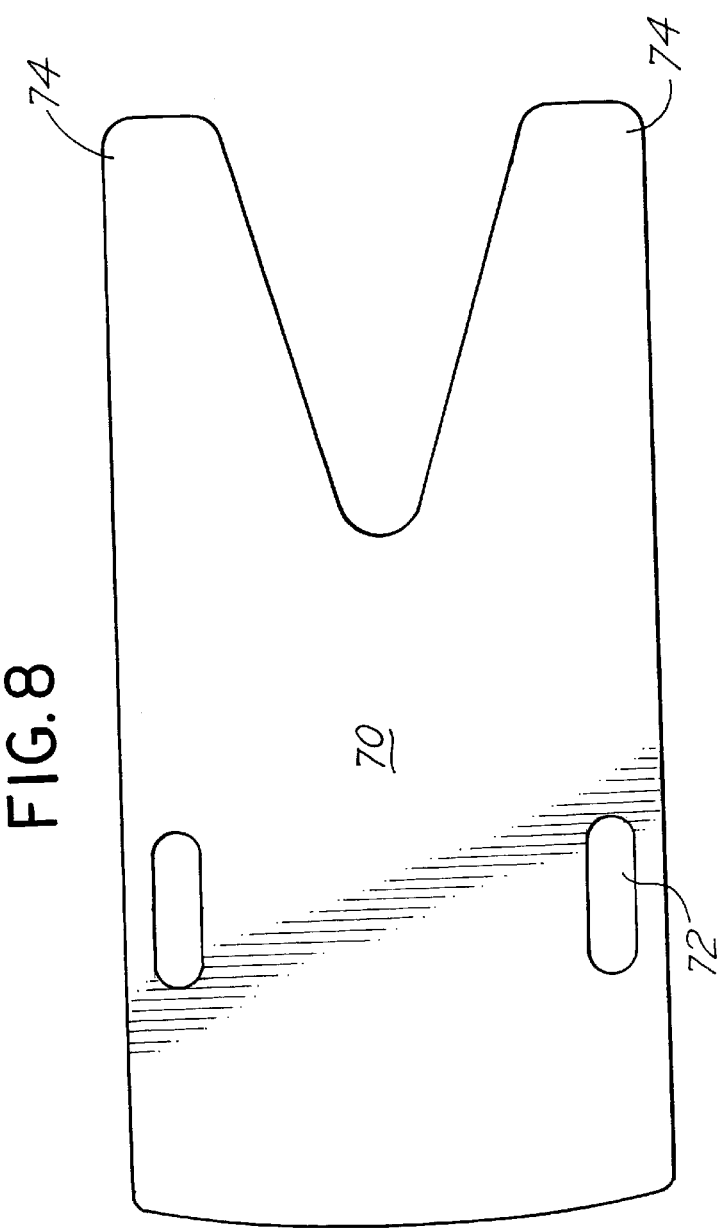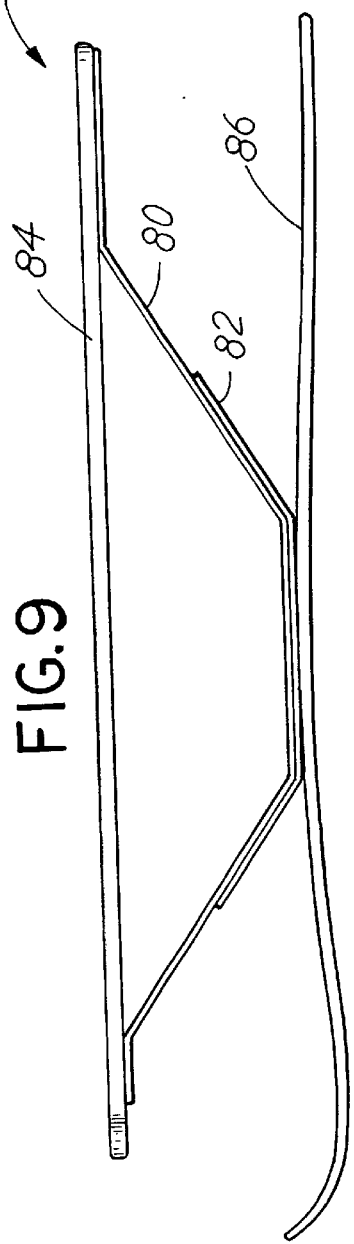

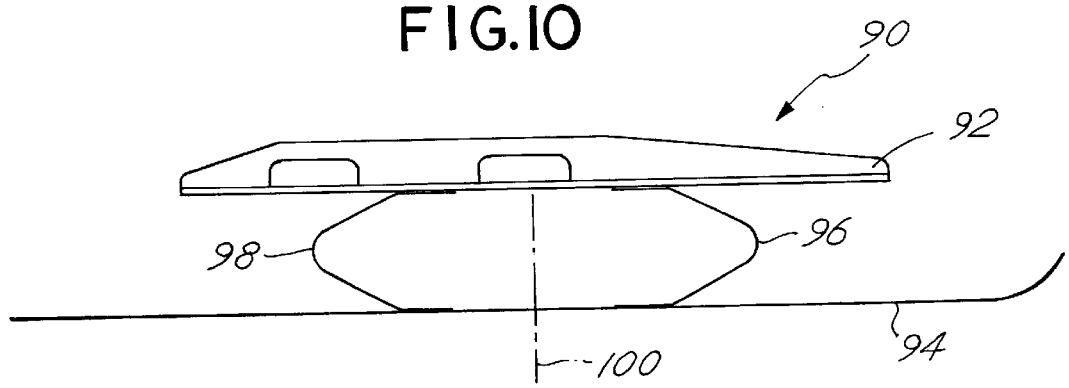
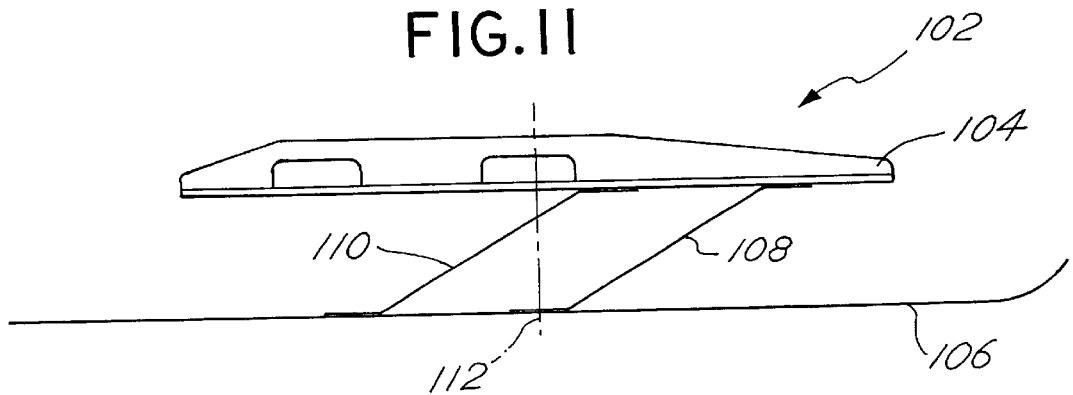

MANEUVERABLE SLED

BACKGROUND OF THE INVENTION

This invention relates to a sled for use over snow-covered terrain. In particular, this invention relates to a sled for increased maneuverability and comfort by use of an innovative suspension system.

Recreational snow sleds are often characterized by a platform attached to at least two runners and with handles for maneuverability. The typical snow sled that comes to ones mind is a child's sled with thin metal runners that are made integral with a frame that supports a small platform on which the child may sit or lay. Such snow sleds may be acceptable for even, snow-covered terrain where few turns are necessary. However, to accommodate rougher terrain and increase maneuverability, these typical metal runner sleds are not acceptable. Additionally, these sleds typically cannot comfortably accommodate an adult. Other sleds designed for adults often provide an uncomfortable ride with difficult maneuvering.

Accordingly, it is an object of the present invention to provide a sled for use on snowy terrain with increased maneuverability.

It is a further object of the invention to provide a sled with a suspension system to provide an adult a comfortable ride over uneven, snowy terrain.

It is a further object of the invention to provide a sled with a platform that can comfortably accommodate an adult.

Another object of the invention is to provide a snow sled with a suspension system providing a smooth and comfortable ride for the user even over uneven snow-covered terrain.

SUMMARY OF THE INVENTION

The present invention relates to snow sleds and primarily to snow sleds with a suspension system that provides excellent maneuverability and effectively absorbs the shocks and jolts normally associated with sled travel over snowy terrain.

The sled consists of a platform, at least two springs, and two runners. The runners may be conventional skis. The springs are preferably made of spring steel and are attached to the platform at two locations, a rear location and a forward location. The attachment of the springs to the platform at the forward location is fixed in that bolts directly attach the springs to the platform. The connection at the rear is a sliding connection where the spring has a slot that is engaged by a slidably fitting bolt and washer that mounts the spring to the platform. In this way, the platform slides with respect to the spring and provides the desired and necessary suspension characteristic to the sled to provide the sled with the excellent maneuverability and shock resistance.

BRIEF DESCRIPTION OF THE DRAWINGS

FIG. 1 is an elevated perspective view of a sled constructed according to the principles of the invention.

FIG. 2 is an elevated side view of the sled illustrated at FIG. 1 without the sidewalls.

FIG. 3 is a cross sectional view of a portion of the sled showing the mounting of the spring to the platform of the sled.

FIG. 8 is an elevated plan view of an alternative embodiment for the platform.

FIG. 9 shows an alternative embodiment for the spring of the sled.

FIG. 10 shows an alternative embodiment for the spring of the sled.

FIG. 11 shows an alternative embodiment for the spring of the sled.

DETAILED DESCRIPTION OF A PREFERRED EMBODIMENT

Figure 4:
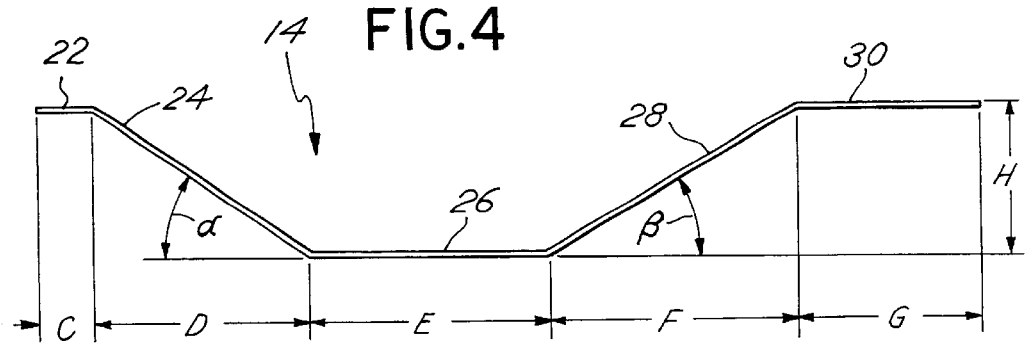
FIG. 4 is an elevated side view of the spring of the sled.

FIG. 1 is an elevated perspective view of a sled constructed according to the principles of the invention. A sled 10 includes a platform 12, springs 14 and runners 16. The platform may include sidewalls 13 with openings 15 to provide a gripping handle. The springs 14 have a widened U-shape. The springs 14 are attached at their lower end to the runners 16 and at their upper ends to the platform 12. The front connection of the springs 14 to the platform 12 is fixed. The rear connection of the springs 14 to the platform 12 is a sliding engagement between the springs 14 and the platform 12. In particular, the rear upper portion of the springs 14 is provided with a slot (FIGS. 5 and 6) to accommodate a bolt 20 that passes through the platform 12 to engage the slot of the rear upper portion of the springs 14. In this way, the bolt 20 is able to slide within the slot and provide the desired maneuverability and suspension characteristics.

FIG. 2 is an elevated side view of the sled 10 without the sidewalls. FIG. 2 provides a more clear illustration of the preferred shape of the springs 14. As shown, spring 14 has a widened U-shape and consists of five regions. The first region 22 is a generally flat region designed to be generally horizontal and attached to the underside of the platform 12. The second region 24 is designed to extend from the first region to the third region 26 and, in part, defines the distance between the runner 16 and the platform 12. The third region 26 is designed to extend between the second region 24 and the fourth region 28. The third region 26 is designed to be generally flat such that it may be placed and attached horizontally onto the runner 16. The fourth region 28 is the counterpart to the second region 24 and extends between the third region 26 and the fifth region 30. The fourth region 28 in combination with the second region 24 define the vertical distance between the runner 16 and the platform 12. The fourth region 28 angles rearward and upward from the third region 26. The fifth region 30 extends away from the fourth region and is designed to be generally flat and horizontal such that the platform 12 may rest on the fifth region 30. As a result, the spring 14 supports the platform 12 at the first region 22 and the fifth region 30. The fifth region 30 is provided with a slot (FIGS. 5 and 6) that enable the fifth region 30 to be slidingly attached to the platform 12. This sliding engagement is further discussed below. Also shown in FIG. 2 are Detail A and Detail B which relate to the attachment of the spring 14 to the platform 12. These Details will be further discussed below. Additionally, Detail A shown in connection with the attachment of the first region 22 to the platform 12 may also be used as the detail for attaching the third region 26 of the spring 14 to the runner 16.

FIG. 3 shows Detail B in more detail. Bolt 20 is shown passing through platform 12 to engage fifth region 30 of the spring 14. The bolt 20 includes a head 32 and a shaft with a smooth region 34 and a lower threaded region 36. The platform 12 is provided with a bore designed to engage the bolt 20. The bolt 20 may be inserted into the bore such that the head 32 rests on the upper surface of the platform 12 and the smooth region 34 of the bolt 20 passes through the platform 12 and the spring 14. The lower region of the bolt 20 is threaded to provide the threaded region 36 which may be engaged by a corresponding threaded nut 40. A washer 38 may be placed between the nut 40 and the fifth region 30 of the spring 14. Of course, the nut 40 will have an outer diameter wider than the slot provided in the fifth region 30 of the spring 14. The slot is more fully described below in connection with the description of FIGS. 5 and 6.

It will be understood that a sliding engagement can be provided to the platform 12 relative to the spring 14 by providing the platform 12 with a slot to be engaged by a bolt that is fixed relative to the spring 14. This, however, is a non-favored embodiment because of the possibility that the users clothing or other item may become entangled in this slot and bolt arrangement open on the topside of the platform. Slots located solely in the underside of the platform adequately address this problem.

FIG. 4 is an elevated side view of the spring 14. The preferred spring 14 is designed to employ a conventional snow ski as the runner 16 which may be typically approximately 70–80 inches (175–200 centimeters). The spring 14 is preferably made of spring steel and in particular 1074 spring steel. The spring 14 may be 2 inches wide and have a thickness of 0.125 inches. The spring 14 in its final form may extend horizontally for approximately 41 inches. In particular, the first region 22 may have a horizontal length C of 5 inches. The horizontal length D of second region 24 may extend 10⅞ inches. The horizontal length E of the third region 26 may extend 12 inches. The horizontal length F of fourth region 28 may extend 12⅞ inches. The horizontal length G of the fifth region 30 may extend 9 3/16 inches. The vertical rise H from the bottom of third region 26 to the top of the fifth region 30 may be 8 inches. The angle at which the second region 24 rises from the horizontal may be 35.0°. The angle at which the fourth region 28 rises from the horizontal may be 30.5°. Of course, all of these dimensions are for the preferred embodiment and it will be understood by those skilled in the art that springs may be made with either smaller or greater dimensions depending on the desired size of the end product sled. Additionally, those skilled in the art will recognize that the dimensions of the regions 22, 24, 26, 28, 30 of the spring 14 may be scaled down to provide larger or smaller springs. Where the ratios of the lengths of the various regions 22, 24, 26, 28, 30 remain identical. Further, those skilled in the art will also understand that springs that do not maintain the identical ratios of the lengths between the regions will also provide good maneuverability and suspension characteristics to a sled. Accordingly, the present invention should not be understood to be limited to either the dimensions as described or identically scaled but should also be understood to include springs taking a similar shape but formed with different relative dimensions between the regions.

Figure 5:
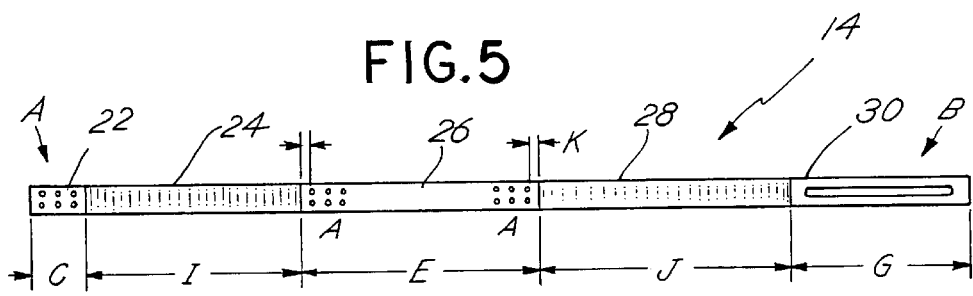
FIG. 5 is an elevated plan view of the spring of the sled.

FIG. 5 is an elevated plan view of spring 14. FIG. 5 shows the preferred spring 14 and its lineal dimensions. That is, FIG. 5 shows the actual length of each region instead of its horizontal dimension as shown in FIG. 4. Thus, dimensions for second region 24 and fourth region 28 are shown as dimensions I and J respectively. Those dimensions may be 13½ and 14½ inches respectively. The other dimensions, that is, dimensions C, E and G, remain unchanged from those described above in connection with FIG. 4. FIG. 5 also illustrates dimension K on third region 26 which corresponds to the distance from Detail A to the second region 24 on the front side and the fourth region 28 on the rear side. That dimension K may be 1 inch.

Figure 6:
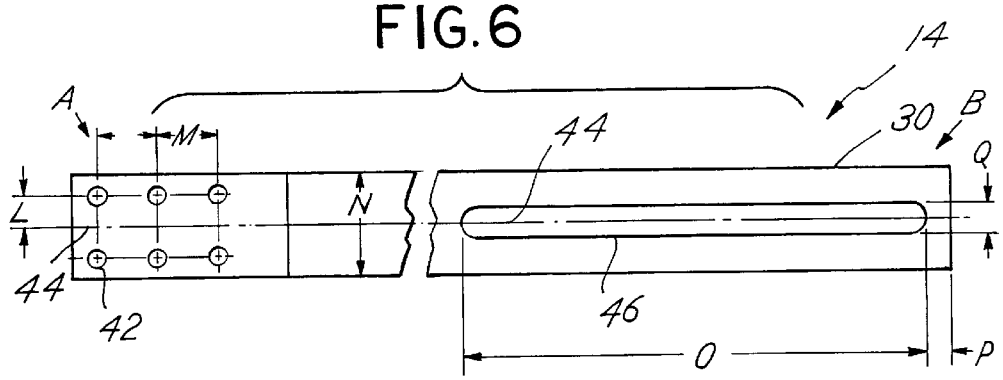
FIG. 6 is an elevated plan view of the various mounting regions of the spring.

FIG. 6 is an elevated plan view of Details A and B of spring 14. Detail A illustrates the bore arrangement in first region 22 and third region 26 of spring 14. In particular, Detail A illustrates six bores 42 arranged symmetrically about a center line 44 of the spring 14. The preferred distance of the center of the bores 42 from center line 44 is dimension L, 0.63 inches. The center of the forward most bore 42 may be approximately ½ inch from the forward most edge of the spring 14. The distance M between the center points of adjacent bores 42 may be 1.13 inches. As noted above, the width N of the spring 14 may be 2.0 inches. Turning to detail B, the fifth region 30 of the spring 14 is provided with a slot centered about the center line 44 of the spring 14. The slot may have a length O of 8 inches and may be spaced from the rear end of the spring 14 a distance P of 0.50 inches. The width of the slot Q may be 0.56 inches. As explained above in connection with the dimensions set forth in describing the spring 14 as illustrated in FIG. 4, these dimensions described in connection with FIGS. 5 and 6 should similarly be understood to be directed only to the preferred embodiment and not to limit the scope of the invention in any way.

Figure 7A:
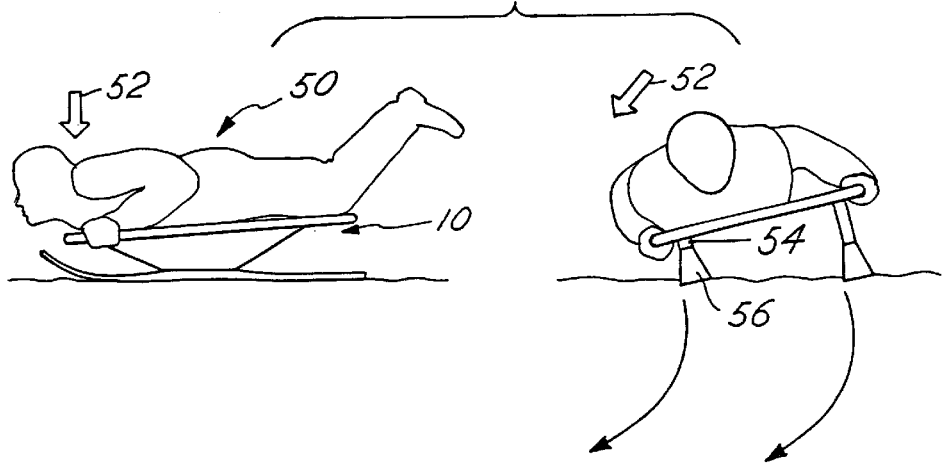
FIG. 7 illustrates the maneuverability of the sled.
Figure 7B:
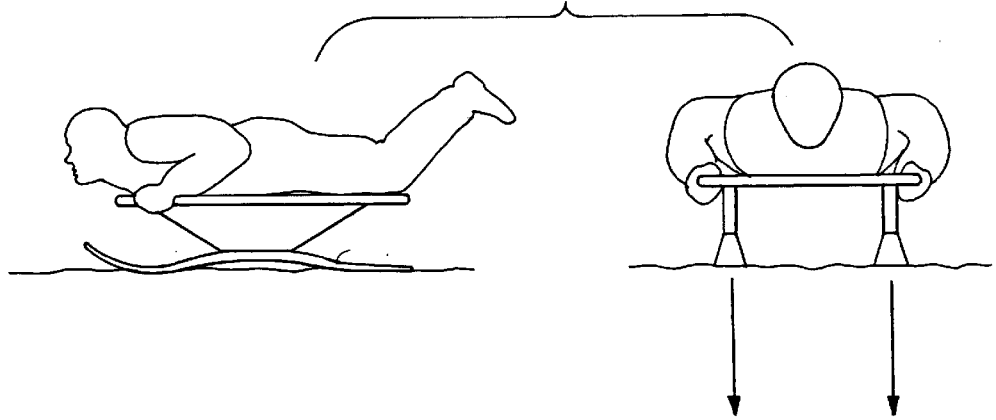
Figure 7C:
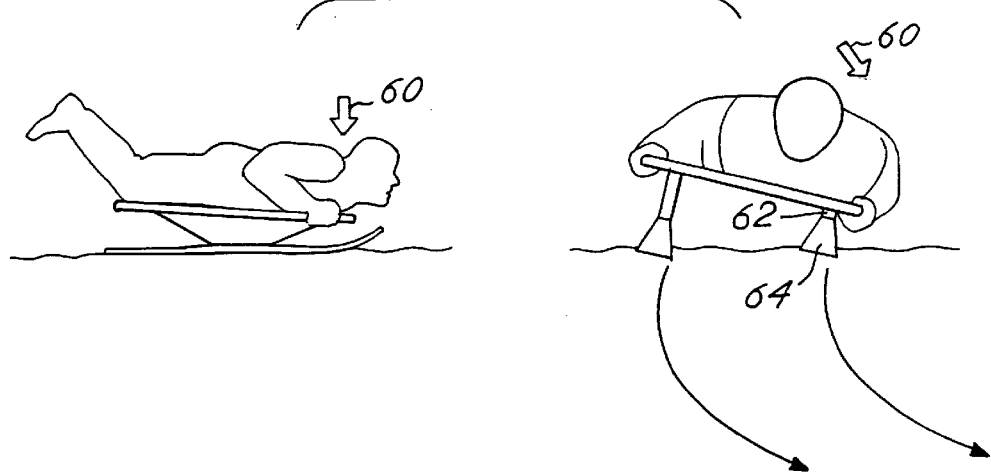

FIG. 7 illustrates the sled in actual use and the maneuverability provided by the invention. In FIG. 7A, the user 50 provides a force 52 to the forward starboard side of the sled 10, thus causing the starboard spring 54 to take on a more flattened profile driving the front outer edge of the starboard runner 56 into the snow causing the sled 10 to carve a turn in the starboard direction. FIG. 7B illustrates the user in a normal position without providing any particular force to either the starboard or the port side of the sled. This results in the sled travelling in a straight direction. FIG. 7C illustrates the user placing a force 60 on the port side of the sled 10 thereby compressing the port spring 62. The outer edge of the port runner 64 is thus driven into the snow such that the sled will make the intended turn in the port direction.

Conventional snow skis or similar runners having outer and inner edges for carving turns are particularly suited for use in the present invention. In particular, the outer edges of snow skis and similar runners assist the user in carving out the turns intended by placing a force to either the starboard or the port sides of the sled.

FIG. 8 is an elevated plan view of an alternative platform 70. The surface of the platform maybe provided with grasping openings 72 and leg extensions 74 to accommodate a users legs, provide a surface for the spring to attach the platform while also eliminating that portion of the platform that would otherwise extend between the leg extension 74 thereby reducing the overall weight of the sled.

FIG. 9 shows an alternative embodiment of the sled 78 of the present invention. In particular, the difference exists in the suspension system that suspends the platform 84 over the runner 86. The suspension system includes a spring 80 generally similar to the spring illustrated in FIGS. 4 through 6 and also includes a reinforcing steel 82. The reinforcing steel is designed to conform to the shape of the lower portion of the spring 80 and reinforces the spring 80 to inhibit unwanted compression of the spring when a user may exert either starboard or port side pressure. Additionally, such a reinforcing steel 82 may be useful on sledding equipment that will be used for carrying heavier loads.

FIG. 10 shows a second alternative embodiment of the suspension system of the present invention. In particular, the sled 90 includes a platform 92 and runners 94 with the platform suspended over the runners 94 by two springs, a forward spring 96 and a rear spring 98. The springs 96, 98 should be attached to the runners 94 and the platform 92 such that the center of gravity 100 in the horizontal direction is centered between forward spring 96 and rear spring 98. The springs 96, 98 may be referred to as generally C-shaped.

FIG. 11 shows yet a further embodiment of the suspension system of the present invention. The sled 102 includes a platform 104 and runners 106. The platform 104 is suspended by forward spring 108 and rear spring 110 above runners 106. the springs 108, 110 may be referred to as generally S-shaped. The platform 104 may be positioned at any location, forward or rear relative to the runners 106 depending on the users preference. Similarly, the forward spring 108 and rear spring 110 may be positioned to support primarily the forward most portion of the platform 104 (as shown) or positioned to more equally distribute the support of the platform 104. Again, the preference of the use will determine the positioning of the forward spring 108 and the rear spring 110.

The invention has now been described in considerable detail; however, it is obvious that others skilled in the art can build and devise alternate and equivalent constructions which are nevertheless within the spirit and scope of the invention. Thus, the protection afforded the invention should not be limited to the preferred embodiment or the detailed description described and illustrated above, but only by the properly construed claims as they appear below.

What is claimed is:

1. A maneuverable sled comprising:

(a) a platform;

(b) two runners spaced apart and aligned parallel to each other and positioned below the platform; and (c) two springs, each having a first end, a second end and a midsection, each spring formed such that the first end and second end generally lie in substantially horizontal planes when the midsection is positioned in a substantially horizontal plane and with the first end and the second end being elevated from the midsection; the midsection of each spring being fixedly attached to the corresponding runner, the first end of the spring being fixedly attached to the platform and the second end being slidingly attached to the platform; and (d) the second end of the spring includes a slot and the platform has a bore for accommodating a bolt to be passed through the passage to engage the slot of the second end of the spring.

2. The maneuverable sled of claim 1 wherein the first end of the spring is in the forward position on the maneuverable sled and the second end is in the rear position of the maneuverable sled.

3. A maneuverable sled comprising:

(a) a platform;

(b) two runners spaced apart and aligned parallel to each other and positioned below the platform; and (c) two springs, each having a first end, a second end and a midsection, each spring formed such that the first end and second end generally lie in substantially horizontal planes when the midsection is positioned in a substantially horizontal plane and with the first end and the second end being elevated from the midsection; the midsection of each spring being fixedly attached to the corresponding runner, the first end of the spring being fixedly attached to the platform and the second end being slidingly attached to the platform.

4. The maneuverable sled of claim 3 wherein the first end of the spring is in the forward position on the maneuverable sled and the second end is in the rear position of the maneuverable sled.

* * * * *